(12) United States Patent
Sykes et al.

(10) Patent No.: US 9,256,294 B2
(45) Date of Patent: Feb. 9, 2016

(54) SELF ALIGNING MINIMAL GAP KEYCAPS

(75) Inventors: Shane Sykes, Woodinville, WA (US); Jerome David Kalamen, Lake Stevens, WA (US); Summer Schneider, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 302 days.

(21) Appl. No.: 13/584,835

(22) Filed: Aug. 14, 2012

(65) Prior Publication Data
US 2014/0048397 A1   Feb. 20, 2014

(51) Int. Cl.
| | |
|---|---|
| *H01H 9/26* | (2006.01) |
| *H01H 13/72* | (2006.01) |
| *H01H 13/76* | (2006.01) |
| *G06F 3/02* | (2006.01) |
| *H01H 13/705* | (2006.01) |

(52) U.S. Cl.
CPC .......... *G06F 3/0202* (2013.01); *H01H 13/705* (2013.01); *H01H 2221/024* (2013.01); *H01H 2221/032* (2013.01)

(58) Field of Classification Search
CPC ....... H01H 13/72; H01H 13/76; H01H 13/70; H01H 13/7006; H01H 13/702; H01H 13/705; H01H 2201/00
USPC .......... 200/50.21–50.27, 43.11, 50.01, 50.03, 200/17 R, 43.01, 310, 5 A, 5 R, 511–512, 200/520, 521, 308, 311, 313, 314, 317, 337, 200/341, 343, 345, 292, 329, 43.16
See application file for complete search history.

(56) References Cited

U.S. PATENT DOCUMENTS

| | | | |
|---|---|---|---|
| 2004/0238710 A1* | 12/2004 | Hsu ......................... | 248/346.03 |
| 2005/0001820 A1 | 1/2005 | Lee | |
| 2006/0011458 A1 | 1/2006 | Purcocks | |
| 2007/0012550 A1 | 1/2007 | Wohlfart | |
| 2009/0128496 A1* | 5/2009 | Huang et al. .................. | 345/170 |
| 2011/0005909 A1* | 1/2011 | Lin et al. ....................... | 200/345 |

FOREIGN PATENT DOCUMENTS

EP   0478991   *   9/1991   ............. H01H 13/70

OTHER PUBLICATIONS

"International Search Report & Written Opinion for PCT Patent Application No. PCT/US2013/053684", Mailed Date: Dec. 5, 2013, Filed Date: Aug. 6, 2013, 7 Pages.

* cited by examiner

*Primary Examiner* — Edwin A. Leon
*Assistant Examiner* — Anthony R. Jimenez
(74) *Attorney, Agent, or Firm* — Jeremy Snodgrass; Judy Yee; Micky Minhas

(57) ABSTRACT

Keyboard keys are outfitted with alignment features whose configuration, placement and geometry on a key serve to allow the key to automatically self-locate when the key returns from a pressed down, accessed, position, to its home, resting, position. In this manner, keyboards can be designed with keys with minimal keycap gaps that reduce the perceptible variance in the keycap spacing to be ascetically pleasing with minimal manufacturing costs.

18 Claims, 3 Drawing Sheets

SELF ALIGNING MINIMAL GAP KEYCAPS

BACKGROUND

Inherent in the manufacturing of massed produced keycaps, also referred to herein as keys, for keyboards is individual keycap imperfections; i.e., not every key is created precisely the same as every other key. To attempt to hide these manufacturing imperfections from consumers, typical keyboards have relatively large keycap gaps, e.g., two and a half to three mm (2.5-3 mm), with a not insignificant keycap wall sloping angle. With such large keycap gaps and sloping wall design the typical keycap placement tolerance on a keyboard of plus or minus three-tenths millimeters (+/−0.3 mm) is not necessarily detrimental to the use of the keyboard. However, when these keycaps are positioned on a keyboard the large keycap gaps, sloping wall design and various inherent key imperfections can result in a keyboard that looks cheap and sloppy, e.g., key rows are crooked because the imperfections in the keycaps result in misalignment, the gaps between keys are perceptively different, etc. For example, the current keyboard tolerance of plus or minus three-tenths millimeters (+/−0.3 mm) can account for greater than an eighty percent (80%) variance in keycap gaps on a keyboard which is negatively perceptible to consumers.

Ultimately these issues can translate into buyer and user dissatisfaction with a company's keyboards.

Moreover, as keyboard companies attempt to create more aesthetically pleasing keyboards with cleaner, crisper lines the keycap gaps become tighter, i.e., smaller, which can actually serve to highlight keycap imperfections and result in an even more sloppy keyboard look. Thus, companies have been known to spend time, resources and money to attempt to reduce keycap manufacturing imperfections with a resultant attempted crisper keyboard look.

Thus it is desirable to develop a keyboard and keycap design that enables keys to self-align themselves in their home, resting, position to reduce the perceptible variance in keycap spacing and result in a cleaner, crisper, keyboard look. It is further desirable to create a universal keycap design that can be easily implemented. It is also advantageous to implement a keycap design that will continue to optimize keyboard manufacturing costs.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include keyboard keys and keyboards with keys that can self-locate independent of the manufacturing tolerances currently achievable with minimal keycap gaps. In embodiments keys of a keyboard are outfitted with alignment features whose configuration, placement and geometry contribute to automatic self-aligning keys when they resume their home position from a pressed down, accessed, position.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

As previously discussed, keycaps are massed manufactured. To help minimize manufacturing costs a typical keycap manufacturing process results in keycaps that are not all exactly the same; e.g., slightly different sizes resulting in slightly differing shapes, etc. When these keycaps are subsequently positioned on a keyboard their imperfections can result in the appearance of sloppy keyboards with keys that appear misaligned; i.e., keyboards with keys in crooked rows. This unpleasing look results in user perceived inadequate and potentially undesirable keyboards that lack the preferred quality.

Figure 1:
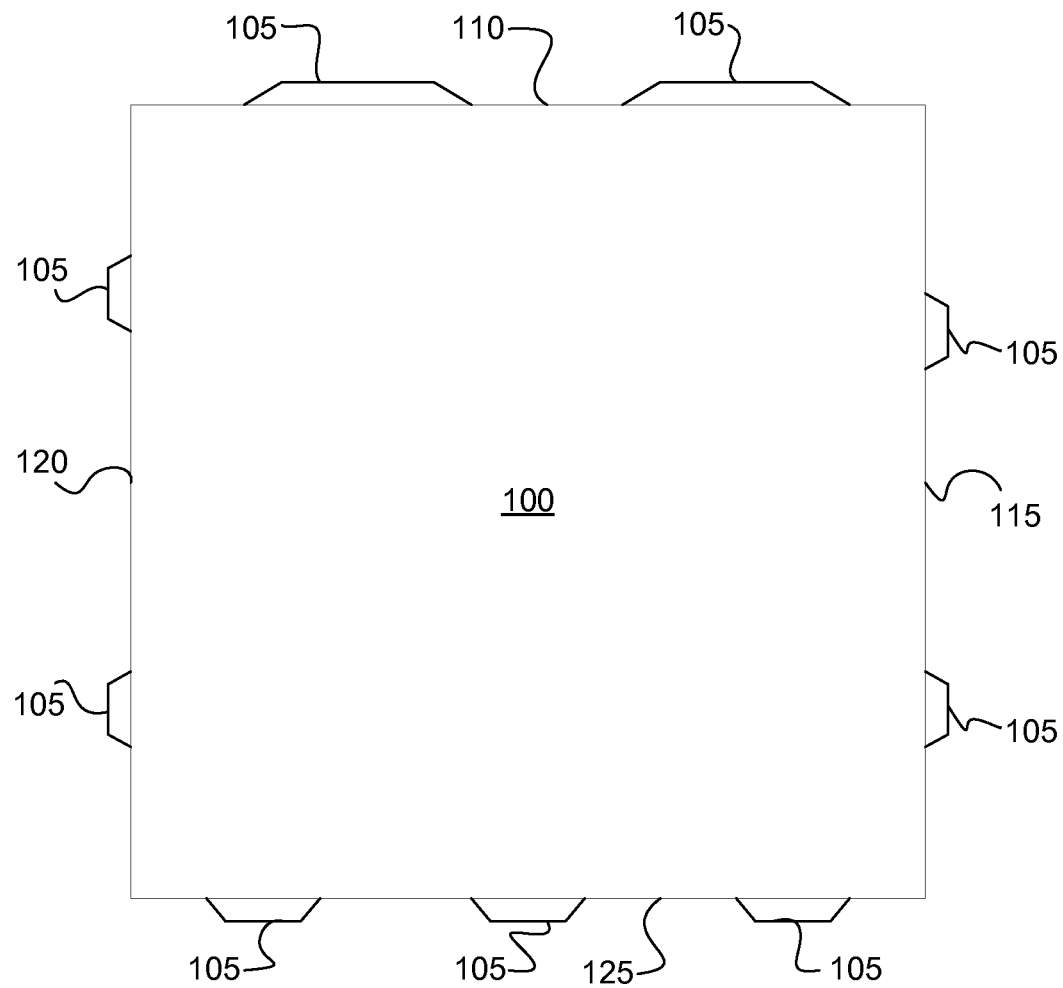
FIG. 1 depicts an exemplary embodiment keycap design for keycap self-alignment with minimal keycap gaps.
Figure 2:
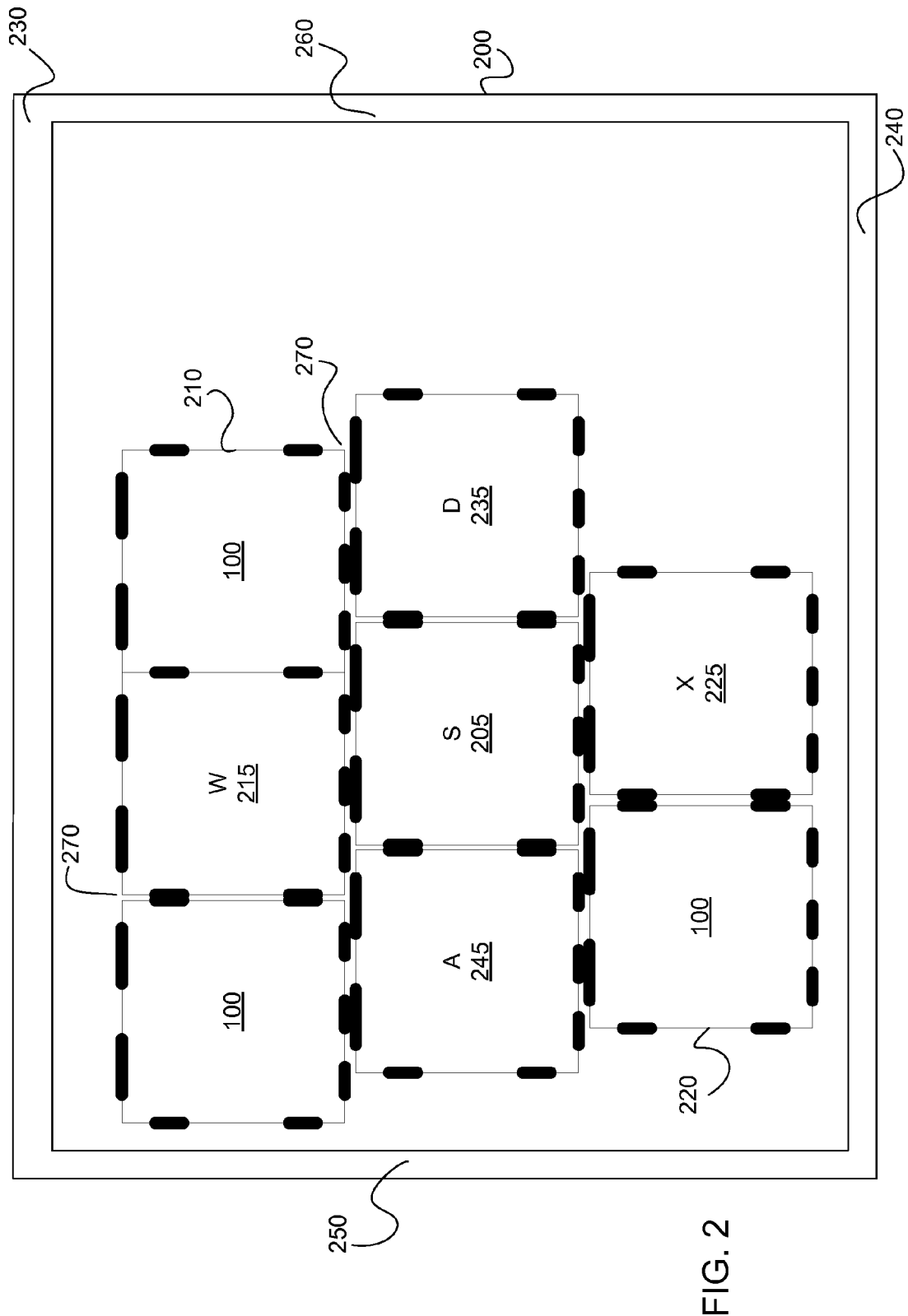
FIG. 2 depicts a portion of an exemplary embodiment keyboard utilizing keycaps with self-aligning nubs.

FIG. 1 depicts an embodiment self-locating, also referred to herein as self-aligning, keycap 100, also referred to herein as a key 100. In an embodiment when keycap 100 is positioned on an embodiment keyboard 200, a portion of which is depicted in FIG. 2, with other self-aligning keycaps 100 the keys 100 of the keyboard 200 will be aligned, i.e., in even rows, with minimal keycap 100 gaps 270 independent of the manufacturing tolerances currently achievable in the keyset manufacturing process. The resultant keyboard 200 is ascetically pleasing to users and results in a perceived quality keyboard 200. Additionally the resultant keyboard 200 helps to minimize debris that falls between its keys 100.

Keycap 100 is for an embodiment keyboard 200 designed to embrace the inherent imperfections of manufactured keycaps. In an embodiment keycap 100 is manufactured with alignment features 105, also referred to herein as nubs 105, that cause a keycap 100 to mechanically self-align with its neighboring keys 100 when the keycap 100, after having been suppressed, or otherwise pushed down, by a user, returns to its normal, home, i.e., resting or unused, position on the keyboard 200. The embodiment keyboard 200 of FIG. 2, with embodiment keycaps 100, has the resultant capability to self-align keycaps 100 within the keyboard 200.

In an embodiment the nubs 105 of a keycap 100 are manufactured of the same material as the keycap 100. In alternative embodiments nubs 105 can be derived from materials other than the material of the keycap 100.

Figure 3:
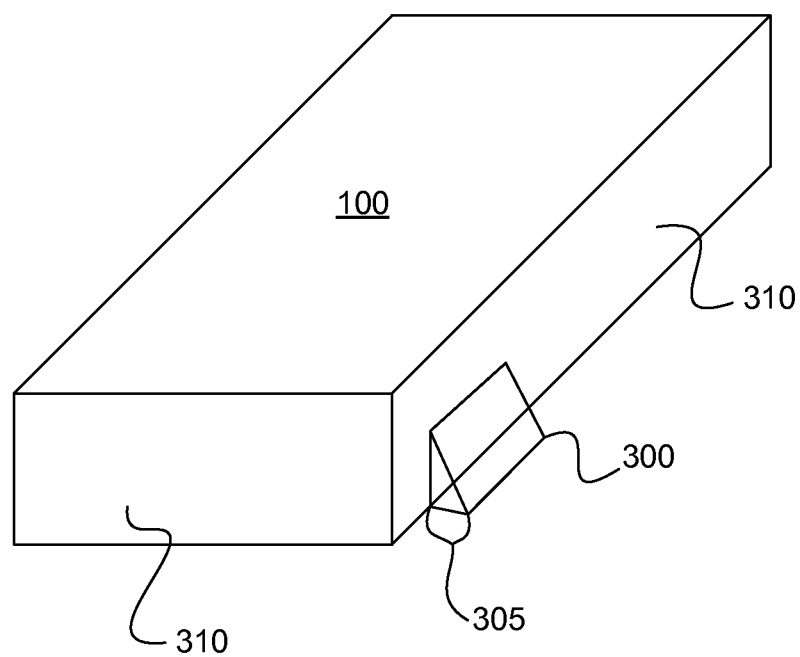
FIG. 3 illustrates an embodiment nub design for an embodiment self-aligning keycap.

In an embodiment the nubs 105 of a keycap 100 are formed as a portion of, or alternatively, otherwise attached to, the base of one or more sides of a keycap 100 as can be seen in FIG. 3.

Referring again to FIG. 1, in an embodiment all the keys 100 of a keyboard 200 are designed with at least one nub 105. In an alternate embodiment only the qwerty keys 100 of a keyboard 200, i.e., the keys used to type letters and numbers, are outfitted with at least one nub 105. In other alternative embodiments other subsets of a keyboard's keys 100 are designed with at least one nub 105.

In an embodiment each embodiment keycap 100, i.e., each keycap that is designed with at least one nub 105, has a minimum of two contact points with neighboring keys top and bottom when the keycaps 100 are in their home, resting, position. Thus, in an embodiment at least two nubs 105 on the top of a keycap 100 come into contact with, also referred to herein as touch, at least two nubs 105 on a keycap(s) 100 above it and at least two nubs 105 on the bottom of a keycap 100 touch at least two nubs 105 on a keycap(s) 100 below it when the keycaps 100 are in their home position. For example, and referring to FIG. 2, in an embodiment the S key 205 has at least two nubs 105 that touch at least two nubs on the W key 215 positioned above it when both the S key 205 and the W key 215 are in their home position. In this example and embodiment the S key 205 also has at least two nubs 105 that touch at least two nubs 105 on the X key 225 positioned below it when both the S key 205 and the X key 225 are in their home position.

In an embodiment nubs 105 are included on one or more sides framing the keyboard 200.

In an embodiment nubs 105 are included on the top keyboard frame 230 which is a top portion, or side, of the keyboard 200 that houses keys 100 of the keyboard 200. In an aspect of this embodiment the nubs 105 on the top keyboard frame 230, also referred to herein as top keyboard side 230, of simply keyboard side 230, are positioned so that each embodiment key 100 in the top keyboard row 210, i.e., the top row positioned keys 100 within a keyboard frame, e.g., keys 100 for the numbers one through nine (1-9) of a qwerty keyboard 200, has a minimum of two nubs 105 that touch at least two nubs 105 on the top keyboard frame 230 when the key 100 in the top keyboard row 210 is in its home position.

In an embodiment nubs 105 are included on the bottom keyboard frame 240 which is a bottom portion or side, of the keyboard 200 that houses keys 100 of the keyboard 200. In an aspect of this embodiment the nubs 105 on the bottom keyboard frame 240, also referred to herein as bottom keyboard side 240, or simply keyboard side 240, are positioned so that each embodiment key 100 in the bottom keyboard row 220, i.e., the bottom row positioned keys 100 within a keyboard frame, e.g., the space bar, CTRL key(s), etc. of a qwerty keyboard 200, has a minimum of two nubs 105 that touch at least two nubs 105 on the bottom keyboard frame 240 when the key 100 in the bottom keyboard row 220 is in its home position.

In an embodiment each key 100 has at least one nub 105 on one keycap side that will come into contact, i.e., touch, with at least one nub 105 on a neighboring key 100 to its right and/or left when the key 100 is in its home position.

In an aspect of this embodiment each key 100 has two nubs 102 on each of its keycap sides that will each come into contact with at least one nub 102 on the neighboring keys to its right and left when the key 100 is in its home position. For example, in an embodiment the S key 205 has two nubs 105 that each touch a nub 105 on its left neighboring A key 245 when the S key 205 and the A key 245 are both in their home position. In this example and embodiment the S key 205 also has two nubs 105 that each touch a nub 105 on its right neighboring D key 235 when the S key 205 and the D key 235 are both in their home position.

In an embodiment nubs 105 are included on a left-side keyboard frame 250 which is a portion, or side, of the keyboard 200 positioned on the left of a section of the keyboard 200 housing keys 100. In an aspect of this embodiment the nubs 105 on a left-side keyboard frame 250, also referred to herein as left keyboard side 250, or simply keyboard side 250, are positioned so that each embodiment key 100 bordering the left-side keyboard frame 250, e.g., a TAB key, a CAPS LOCK key, etc. of a qwerty keyboard 200, has a minimum of two nubs 105 that touch at least two nubs 105 on the left-side keyboard frame 250 when the key 100 bordering the left-side keyboard frame 250 is in its home position.

In an embodiment nubs 105 are included on a right-side keyboard frame 260 which is a portion, or side, of the keyboard 200 positioned on the right of a section of the keyboard 200 housing keys 100. In an aspect of this embodiment the nubs 105 on a right-side keyboard frame 260, also referred to herein as right keyboard side 260, or simply keyboard side 260, are positioned so that each embodiment key 100 bordering the right-side keyboard frame 260, e.g., a BACKSPACE key, a SHIFT key, etc. of a qwerty keyboard 200, has a minimum of two nubs 105 that touch at least two nubs 105 on the right-side keyboard frame 260 when the key 100 bordering the right-side keyboard frame 260 is in its home position.

In an embodiment the number, size and position of nubs 105 on a keycap 100 is designed to ensure the keycap 100 mechanically locates its intended home position relative to its neighbor keycaps 100 with a minimal amount of friction and a minimal manufacturing cost when the key 100 is released from a suppressed position. In an embodiment each keycap 100 for an embodiment keyboard 200 is designed with the same configuration of nubs 105 to minimize manufacturing expense. In an embodiment keycaps 100 for differing keyboard 200 constructions may embody differing nub 105 positioning and/or configurations to minimize friction within the specific keyboard 200 design.

Referring again to FIG. 1, in an embodiment a keycap 100 is configured with two nubs 105 on three sides 110, 115 and 120 and three nubs 105 on the forth side 125. In an aspect of this embodiment two nubs 105 on one side 110 of a keycap 100 are designed larger, i.e., are longer in length, than the four nubs 105 positioned on the other two sides 115 and 120 of the keycap 100 that each include two nubs 105. In an aspect of this embodiment the two nubs 105 on keycap side 115 and the two nubs 105 on keycap side 120 are all designed to be the same size.

In an embodiment the nubs 105 configured on the keycap side 125 with three nubs are each smaller, i.e., are shorter in length, than each of the two nubs 105 configured on the keycap side 110. In an embodiment the nubs 105 configured on the keycap side 125 are also each smaller, i.e., are shorter in length, than each of the four nubs 105 configured on the keycap sides 115 and 120. In an embodiment the three nubs 105 on the keycap side 125 are all designed to be the same size.

In an embodiment each nub 105 is designed to be the minimum size that can still negate keycap misalignment from the vertical offset of the keys 100 of the keyboard 200.

In alternative embodiments the nubs 105 on any particular keycap 100 side can be differing sizes; e.g., all the nubs 105 on sides 115, 120 and 125 can be the same size, nubs 105 on sides 115 and 120 can each be smaller, i.e., can be shorter in length, than any of the three nubs 105 on side 125, etc.

In alternative embodiments the number of nubs 105 on any particular keycap side can be different, e.g., sides 115, 120 and 125 can each support three nubs 105, etc.

In an embodiment the number of nubs 105 designed on a keycap 100 and each of their sizes is minimized to the extent allowable for accommodating their purpose in keycap alignment as well as manufacturing variances in the nubs 105 themselves.

In an embodiment a keycap 100 is designed so that its side 125 with three nubs 105, when it rests in its home position against a neighboring keycap 100, will have contact with at least one nub 105 on the side 110 of the neighboring keycap 100 that houses the two larger nubs 105. In an aspect of this embodiment at least two nubs 105 on side 125 of a keycap 100 in its home position will come into contact with the two nubs 105 on side 110 of a neighboring key 100 positioned below it in the keyboard 200 as depicted in FIG. 2.

In an embodiment the nubs 105 on side 115 of a keycap 100 are positioned parallel to the nubs 105 on side 120 of the keycap 100 as depicted in FIG. 1.

In an embodiment the configuration and placement of the keycap nubs 105 is designed to ensure that a keycap 100 resuming its home position from a suppressed, i.e., typed, position, will settle into the desired home position that provides for aligned keyboard keys 100 by coming into contact with nubs 105 on neighboring keys 100. In an embodiment the configuration and placement of the keycap nubs 105 is designed to ensure that a keycap 100 resuming its home position from a suppressed position will settle into the desired home position that provides for aligned keyboard keys 100 by coming into contact with nubs 105 on respective neighboring keyboard sides, e.g., keyboard side 230, keyboard side 240, keyboard side 250 and/or keyboard side 260.

In an embodiment the configuration and placement of nubs 105 on a keyboard side, e.g., keyboard side 230, keyboard side 240, keyboard side 250 and/or keyboard side 260, is designed to ensure that when a keycap 100 neighboring one or more keyboard sides resumes its home position from a suppressed position it will settle into the desired home position that provides for aligned keyboard keys 100 by coming into contact with nubs 105 on the respective neighboring keyboard side(s).

In alternative embodiments differing nub 105 configurations and/or placements can be utilized.

In an embodiment the geometry of each nub 105 is designed to ensure that keys 100 will not lock or otherwise hang on one another when the keys 100 are in their home position, when they are in their suppressed position and when they are in movement either to or from their home position. In an embodiment the geometry of each nub 105 is further designed to minimize friction between keys 100 when the nubs 105 are being employed to assist a key 100 to self-align itself to its intended home position. In this manner keys 100 will not feel "sticky" to a user when a user is typing and the nubs 105 on the keycaps 100 will not wear down to become less or even totally ineffectual.

In an embodiment the configuration and placement of nubs 105 on the various sides of a keycap 100 are also designed to ensure no key locking and minimize key friction. In an embodiment the configuration and placement of nubs 105 on a keyboard side, e.g., keyboard side 230, keyboard side 240, keyboard side 250 and keyboard side 260, are designed to ensure no key locking and minimize key friction.

Referring to FIG. 3 an embodiment nub geometry 300 is depicted. In an embodiment each nub 105 is positioned on the base 310 of a keycap 100. In an embodiment each nub 105 has a nub angle 305. In an aspect of this embodiment each nub angle 305 is seventy-seven (77) degrees from vertical. In other aspects of this embodiment each nub angle 305 can be a different size and/or various nubs 105 on a keycap 100 can have differing angles 305 that may be influenced by one or more factors including, but not limited to, the depth of the keycaps 100 and key 100 travel.

In an embodiment the geometry 300 of a keycap nub 105 is designed to ensure keys 100 will not lock or otherwise hang on each other.

In an embodiment the geometry 300 of a keycap nub 105 is designed to ensure that the nubs 105 positioned between neighboring keys 100 only come into contact when the keys 100 are in their home position. In an embodiment the geometry 300 of a nub 105 is designed to ensure that the nubs 105 between a keycap 100 and a keyboard side, e.g., keyboard side 230, keyboard side 240, keyboard side 250 and keyboard side 260, only come into contact when the key 100 is in its home position.

In an embodiment when a user presses a keycap 100 for the key 100 to go down the nub geometry 300 is such that there will be no discernible interference between the pressed key 100 and its neighboring keys and/or keyboard side(s).

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A keycap for a keyboard, the keycap comprising:
   a configuration of at least one nub on the keycap that will assist the keycap to align with at least one neighboring keycap of the keyboard when the keycap returns from a suppressed position to a resting position on the keyboard, the at least one nub comprising a portion of a base of the keycap;
   a placement of a first nub on the keycap that results in the first nub touching a second nub on a first neighboring keycap of the keyboard when the keycap and the first neighboring keycap are both in their resting position on the keyboard; and
   a geometry for a third nub on the keycap comprising an angle that assists the keycap to align with a second neighboring keycap of the keyboard when the keycap returns from a suppressed position to a resting position on the keyboard while reducing friction between the keycap and the second neighboring keycap.

2. The keycap of claim 1, further comprising: a configuration of at least two nubs on at least one side of the keycap that will assist the keycap to align with the at least one neighboring keycap of the keyboard when the keycap returns from the suppressed position to the resting position on the keyboard; and
   a placement of each of the at least two nubs that results in each of the at least two nubs touching a nub on the at least one neighboring keycap or at least one additional neighboring keycap of the keyboard when the keycap and the at least one neighboring keycap or the at least one additional neighboring keycap are both in their resting position on the keyboard.

3. The keycap of claim 1, further comprising:
   at least two nubs on a first side of the keycap;
   at least two nubs on a second side of the keycap;
   at least two nubs on a third side of the keycap; and
   at least three nubs on a fourth side of the keycap.

4. The keycap of claim 3, wherein the nubs on the first side of the keycap are longer in length than any of the nubs on the second side of the keycap and are also longer in length than any of the nubs on the third side of the keycap.

5. The keycap of claim 4, wherein the nubs on the first side of the keycap are positioned on the keycap to each touch at least one nub on the first neighboring keycap positioned above the keycap on the keyboard when the keycap and the first neighboring keycap are both in their resting position on the keyboard; wherein the nubs on the second side of the keycap are positioned on the keycap to each touch at least one nub on the second neighboring keycap positioned to the right of the keycap on the keyboard when the keycap and the second neighboring keycap are both in their resting position on the keyboard; wherein the nubs on the third side of the keycap are positioned on the keycap to each touch at least one nub on a third neighboring keycap positioned to the left of the keycap on the keyboard when the keycap and the third neighboring keycap are both in their resting position on the keyboard, and wherein at least two nubs on the fourth side of the keycap are positioned on the keycap to each touch at least one nub on a fourth neighboring keycap positioned below the keycap on the keyboard when the keycap and the fourth neighboring keycap are both in their resting position on the keyboard.

6. The keycap of claim 1, wherein each nub of the keycap is made of the same material as the keycap.

7. The keycap of claim 1, wherein each of the four sides of the keycap comprise at least two nubs.

8. The keycap of claim 7, further comprising:
two nubs on a first side of the keycap comprising at least a portion of the base of the first side of the keycap;
two nubs on a second side of the keycap comprising at least a portion of the base of the second side of the keycap;
two nubs on a third side of the keycap comprising at least a portion of the base of the third side of the keycap; and,
three nubs on a fourth side of the keycap comprising at least a portion of the base of the fourth side of the keycap.

9. A keyboard comprising the capability to self-align at least two keycaps of the keyboard, the keyboard comprising:
a first keycap for a first key of the keyboard comprising a configuration of at least one nub on a base of the first keycap that will assist the first keycap to align with at least one neighboring keycap for a second key of the keyboard when the first keycap returns from a suppressed position to a resting position on the keyboard, the at least one nub on the base of the first keycap configured to touch an additional nub of the neighboring keycap when the keycap and the neighboring keycap are both in their resting position on the keyboard.

10. The keyboard of claim 9, further comprising at least one keycap comprising:
a placement of a nub on a side of the keycap that results in the nub on the side of the keycap touching a nub on a neighboring keycap of the keyboard when the keycap and the neighboring keycap are both in their resting position on the keyboard; and
a geometry for the at least one nub on the base of the first keycap comprising an angle that assists the first keycap to align with the at least one neighboring keycap of the keyboard when the keycap returns from the suppressed position to the resting position on the keyboard while reducing friction between the first keycap and the at least one neighboring keycap.

11. The keyboard of claim 10, wherein the first keycap further comprises:
a configuration of at least two nubs on at least one side of the base of the first keycap that will assist the first keycap to align with the at least one neighboring keycap of the keyboard when the first keycap returns from the suppressed position to the resting position on the keyboard; and a placement of each of the at least two nubs that results in each of the at least two nubs touching a nub on the at least one neighboring keycap or at least one additional neighboring keycap of the keyboard when the first keycap and the at least one neighboring keycap or the at least one additional neighboring keycap are both in their resting position on the keyboard.

12. The keyboard of claim 10, wherein the first keycap further comprises:
at least two nubs on a first side of the first keycap;
at least two nubs on a second side of the first keycap;
at least two nubs on a third side of the first keycap; and
at least three nubs on a fourth side of the first keycap.

13. The keyboard of claim 12, wherein the configuration, the placement and the geometry of the nubs of each keycap for each key of the keyboard are the same.

14. The keyboard of claim 12, wherein the nubs on the first side of the first keycap are positioned on the first keycap to each touch at least one nub on a first neighboring keycap positioned above the first keycap on the keyboard when the first keycap and the first neighboring keycap are both in their resting position on the keyboard;
wherein the nubs on the second side of the first keycap are positioned on the first keycap to each touch at least one nub on a second neighboring keycap positioned to the right of the first keycap on the keyboard when the first keycap and the second neighboring keycap are both in their resting position on the keyboard;
wherein the nubs on the third side of the first keycap are positioned on the first keycap to each touch at least one nub on a third neighboring keycap positioned to the left of the first keycap on the keyboard when the first keycap and the third neighboring keycap are both in their resting position on the keyboard, and
wherein at least two nubs on the fourth side of the first keycap are positioned on the first keycap to each touch at least one nub on a fourth neighboring keycap positioned below the first keycap on the keyboard when the first keycap and the fourth neighboring keycap are both in their resting position on the keyboard.

15. The keyboard of claim 12, wherein each nub of the first keycap is made of the same material as the first keycap.

16. The keyboard of claim 10, wherein each of the four sides of each keycap for a key of the keyboard comprises at least two nubs.

17. A keyboard with a keycap for two or more keys of the keyboard, the keyboard comprising at least two self-aligning keycaps for the keys of the keyboard each comprising a configuration of at least one nub positioned on a base of the self-aligning keycap that will assist the self-aligning keycap to self-align with at least one neighboring keycap on the keyboard when the self-aligning keycap returns from a suppressed position to a resting position on the keyboard, the at least one nub on the base of the self-aligning keycap configured to touch an additional nub of the at least one neighboring keycap when the self-aligning keycap and the at least one neighboring keycap are both in their resting position on the keyboard.

18. The keycap of claim 1, wherein the first neighboring keycap and the second neighboring keycap are a single keycap.

* * * * *